US012700115B2

(12) United States Patent
Amberg et al.

(10) Patent No.: US 12,700,115 B2
(45) Date of Patent: Aug. 4, 2026

(54) USER REPRESENTATION USING DEPTHS RELATIVE TO MULTIPLE SURFACE POINTS

(71) Applicant: Apple Inc., Cupertino, CA (US)

(72) Inventors: Brian Amberg, Zollikon (CH); John S. McCarten, Boulder, CO (US); Nicolas V. Scapel, London (GB); Peter Kaufmann, Zurich (CH); Sebastian Martin, Schwerzenbach (CH)

(73) Assignee: Apple Inc., Cupertino, CA (US)

( * ) Notice: Subject to any disclaimer, the term of this patent is extended or adjusted under 35 U.S.C. 154(b) by 382 days.

(21) Appl. No.: 18/214,604

(22) Filed: Jun. 27, 2023

(65) Prior Publication Data

US 2024/0005537 A1     Jan. 4, 2024

Related U.S. Application Data

(60) Provisional application No. 63/357,087, filed on Jun. 30, 2022.

(51) Int. Cl.
| | |
|---|---|
| *G06T 7/521* | (2017.01) |
| *G06T 13/40* | (2011.01) |
| *G06V 40/16* | (2022.01) |

(52) U.S. Cl.
CPC .............. *G06T 7/521* (2017.01); *G06T 13/40* (2013.01); *G06V 40/176* (2022.01)

(58) Field of Classification Search
CPC ..... G06T 7/521; G06T 13/40; G06T 2215/16; G06T 2219/2021; G06T 15/04;
(Continued)

(56) References Cited

U.S. PATENT DOCUMENTS

| | | | |
|---|---|---|---|
| 10,636,192 | B1 | 4/2020 | Saragih et al. |
| 2012/0274634 | A1 | 11/2012 | Yamada et al. |

(Continued)

FOREIGN PATENT DOCUMENTS

| | | |
|---|---|---|
| JP | 2014-522536 A | 9/2014 |
| JP | 2020-520030 A | 7/2020 |
| WO | 2022066450 A1 | 3/2022 |

OTHER PUBLICATIONS

"Curved", from https://dictionary.cambridge.org/US/dictionary/english/curved, downloaded Mar. 25, 2026 (Year: 2026).*

(Continued)

*Primary Examiner* — Gregory A Morse
*Assistant Examiner* — Renae A Bitor
(74) *Attorney, Agent, or Firm* — Thompson Hine LLP

(57) ABSTRACT

Various implementations disclosed herein include devices, systems, and methods that generates values for a representation of a face of a user. For example, an example process may include obtaining sensor data (e.g., live data) of a user, wherein the sensor data is associated with a point in time, generating a set of values representing the user based on the sensor data, and providing the set of values, where a depiction of the user at the point in time is displayed based on the set of values. In some implementations, the set of values includes depth values that define three-dimensional (3D) positions of portions of the user relative to multiple 3D positions of points of a projected surface and appearance values (e.g., color, texture, opacity, etc.) that define appearances of the portions of the user.

19 Claims, 10 Drawing Sheets

(58) Field of Classification Search

CPC .......... G06T 17/00; G06T 19/20; G06T 7/70; G06T 2207/30201; G06V 40/176; G06V 40/174; G06V 40/16; G02B 27/017

See application file for complete search history.

(56) References Cited

U.S. PATENT DOCUMENTS

| | | | |
|---|---|---|---|
| 2012/0309520 A1 | 12/2012 | Evertt et al. | |
| 2015/0123967 A1* | 5/2015 | Quinn | G06T 7/60 345/419 |
| 2015/0172637 A1 | 6/2015 | Yoon et al. | |
| 2015/0228081 A1 | 8/2015 | Kim et al. | |
| 2018/0158246 A1 | 6/2018 | Grau et al. | |
| 2019/0045157 A1* | 2/2019 | Venshtain | G06F 3/04815 |
| 2020/0074711 A1 | 3/2020 | Barlier et al. | |
| 2021/0174567 A1* | 6/2021 | Weise | G06V 10/7715 |
| 2021/0192188 A1 | 6/2021 | Mccombe et al. | |
| 2021/0280322 A1* | 9/2021 | Frank | A61B 5/6803 |
| 2021/0375020 A1* | 12/2021 | Zhang | G06T 7/90 |
| 2022/0156998 A1* | 5/2022 | Lee | G06N 20/00 |

OTHER PUBLICATIONS

European Patent Office, Extended European Search Report, European Patent Application No. 23182325.3, 10 pp. Nov. 10, 2023.

Pighin, F. et al., "Synthesizing Realistic Facial Expressions from Photographs," Computer Graphics, SIGGRAPH 2000 Conference Proceedings, New Orleans, LA, 10 pp. Jul. 23, 2000-Jul. 28, 2000; [Computer Graphics Proceedings. SIGGRAPH], New York, NY: ACM, US, Jul. 24, 1998, pp. 75-84, XP059140538.

European Patent Office, Communication Pursuant to Article 94(3) EPC, European Patent Application No. 23182325.3, 7 pp. Jul. 4, 2025.

European Patent Office, Office Action (Communication Pursuant to Article 94(3) EPC), European Patent Application No. 23182325.3, 12 pp. Jan. 24, 2025.

Li, L., "Time-of-Flight Camera—An Introduction", Texas Instruments, 10 pp. Jan. 1, 2024, XP093240038, retrieved from the internet: URL: https://www.ti.com/lit/wp/sloa190b/sloa190b.pdf?ts=1736980681031 [retrieved Jan. 16, 2025].

Japan Patent Office, Notice of Reasons for Refusal issued in counterpart Japanese Patent Application No. 2025-004877 dated Oct. 14, 2025 with English translation (16 pages).

Hernandez, et al., "Laser Scan Quality 3-D Face Moeling Using a Low-Cost Depth Camera", 20th European Signal Processing Conference (EUSIPCO 2012), Bucharest, Romania, Aug. 27-31, 2012, pp. 1995-1999 (Five (5) pages).

Shirai, et al., "Fast Cylindrical Mapping of 3D Model's Geometry by Cylindrical Z-Buffering", 2006, Institute of Electronics, Information and Communication Engineers, vol. J89-A, No. 7, pp. 629-638 with partial machine English translation (13 pages).

Korean Ministry of Intellectual Property, Notice of Final Rejection issued in counterpart Korean Patent Application No. 10-2023-0084098 dated Nov. 17, 2025 with English translation (12 pages).

European Patent Office, Communication under Rule 71(3) EPC, European Patent Application No. 23182325.3, 8 pp. Nov. 14, 2025.

Intellectual Property India, Examination Report issued in counterpart Indian Patent Application No. 202314043921 dated Aug. 7, 2025 (Eight (8) pages).

Japan Patent Office, Decision of Refusal issued in Japanese Patent Application No. 2025-004877 dated Apr. 13, 2026 with English translation (13 pages).

European Patent Office, Decision to grant a European patent pursuant to Article 97(1) EPC issued in European Patent Application No. 23182325.3 dated Mar. 19, 2026 (Two (2) pages).

Japanese Patent Office, Notice of Reasons for Refusal (with English translation), Japanese Patent Application No. 2023-107180, 6 pages, May 28, 2024.

Pighin, F. et al., "Synthesizing Realistic Facial Expressions from Photographs", ACM SIGGRAPH 2006 course on SIGGRAPH' 06, the U.S., pp. 19-28, Jul. 30, 2006.

* cited by examiner

600

USER REPRESENTATION USING DEPTHS RELATIVE TO MULTIPLE SURFACE POINTS

CROSS-REFERENCE TO RELATED APPLICATIONS

This application claims the benefit of U.S. Provisional Application Ser. No. 63/357,087 filed Jun. 30, 2022, which is incorporated herein in its entirety.

TECHNICAL FIELD

The present disclosure generally relates to electronic devices, and in particular, to systems, methods, and devices for representing users in computer-generated content.

BACKGROUND

Existing techniques may not accurately or honestly present current (e.g., real-time) representations of the appearances of users of electronic devices. For example, a device may provide an avatar representation of a user based on images of the user's face that were obtained minutes, hours, days, or even years before. Such a representation may not accurately represent the user's current (e.g., real-time) appearance, for example, not showing the user's avatar as smiling when the user is smiling or not showing the user's current beard. Thus, it may be desirable to provide a means of efficiently providing more accurate, honest, and/or current representations of users.

SUMMARY

Various implementations disclosed herein include devices, systems, and methods that generate a set of values that represent a three-dimensional (3D) shape and appearance of a user's face at a point in time to be used to generate a user representation (e.g., an avatar). In some implementations, a surface that has a non-planar shape (e.g., a cylindrical shape) may be used to reduce distortion. The set of values includes depth values that define depths of portions of the face relative to multiple points on a surface, e.g., points in a grid on a partially-cylindrical surface. For example, a depth value of one point may define that a portion of the face is at depth D1 behind that point's position on the surface, e.g., at depth D1 along a ray starting at that point. The techniques described herein use depth values that are different than the depth values in existing RGBDA images (e.g., red-green-blue-depth-alpha images), because RGBDA images define content depth relative to a single camera location, and the techniques described herein define depths as portions of a face relative to multiple points on a surface of a planar shape (e.g., a cylindrical shape).

Several advantages may be realized using the relatively simply set of values with depth values defined relative to multiple points on a surface. The set of values may require less computation and bandwidth than using a 3D mesh or 3D point cloud, while enabling a more accurate user representation than an RGBDA image. Moreover, the set of values may be formatted/packaged in a way that is similar to existing formats, e.g., RGBDA images, which may enable more efficient integration with systems that are based on such formats.

In general, one innovative aspect of the subject matter described in this specification can be embodied in methods, at a processor of a device, that include the actions of obtaining sensor data of a user, where the sensor data is associated with a point in time. The actions further include generating a set of values representing the user based on the sensor data, where the set of values includes depth values that define three-dimensional (3D) positions of portions of the user relative to multiple 3D positions of points of a projected surface, and appearance values that define appearances of the portions of the user. The actions further include providing the set of values, where a depiction of the user at the point in time is displayed based on the set of values.

These and other embodiments can each optionally include one or more of the following features.

In some aspects, the points are spaced at regular intervals along vertical and horizontal lines on the surface.

In some aspects, the surface is non-planar. In some aspects, the surface is at least partially-cylindrical. In some aspects, the surface is planar.

In some aspects, the set of values is generated based on an alignment such that a subset of the points on a central area of the surface correspond to a central portion of a face of the user. In some aspects, generating the set of values is further based on images of a face of the user captured while the user is expressing a plurality of different facial expressions.

In some aspects, the sensor data corresponds to only a first area of the user, and the set of image data corresponds to a second area including a third area different than the first area.

In some aspects, the method further includes the actions of obtaining additional sensor data of a user associated with a second period of time, updating the set of values representing the user based on the additional sensor data for the second period of time, and providing the updated set of values, wherein the depiction of the user is updated at the second period of time based on the updated set of values.

In some aspects, providing the set of values includes sending a sequence of frames of 3D video data including a frame including the set of values during a communication session with a second device, wherein the second device renders an animated depiction of the user based on the sequence of frames of 3D video data.

In some aspects, the electronic device includes a first sensor and a second sensor, wherein the sensor data is obtained from at least one partial image of a face of the user from the first sensor from a first viewpoint and from at least one partial image of the face of the user from the second sensor from a second viewpoint that is different than the first viewpoint.

In some aspects, the depiction of the user is displayed in real-time.

In some aspects, generating the set of values representing the user is a based on a machine learning model trained to produce the set of values.

In some aspects, the depth values define a distance between a portion of the user and a corresponding point of the projected surface positioned along a ray normal to the projected surface at a position of the corresponding point. In some aspects, the appearance values include color values, texture values, or opacity values.

In some aspects, the electronic device is a head-mounted device (HMD). In some aspects, the HMD includes one or more inward facing image sensors and one or more downward facing image sensors, and the sensor data is captured by the one or more inward facing sensors and the one or more downward facing image sensors.

These and other embodiments can each optionally include one or more of the following features.

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
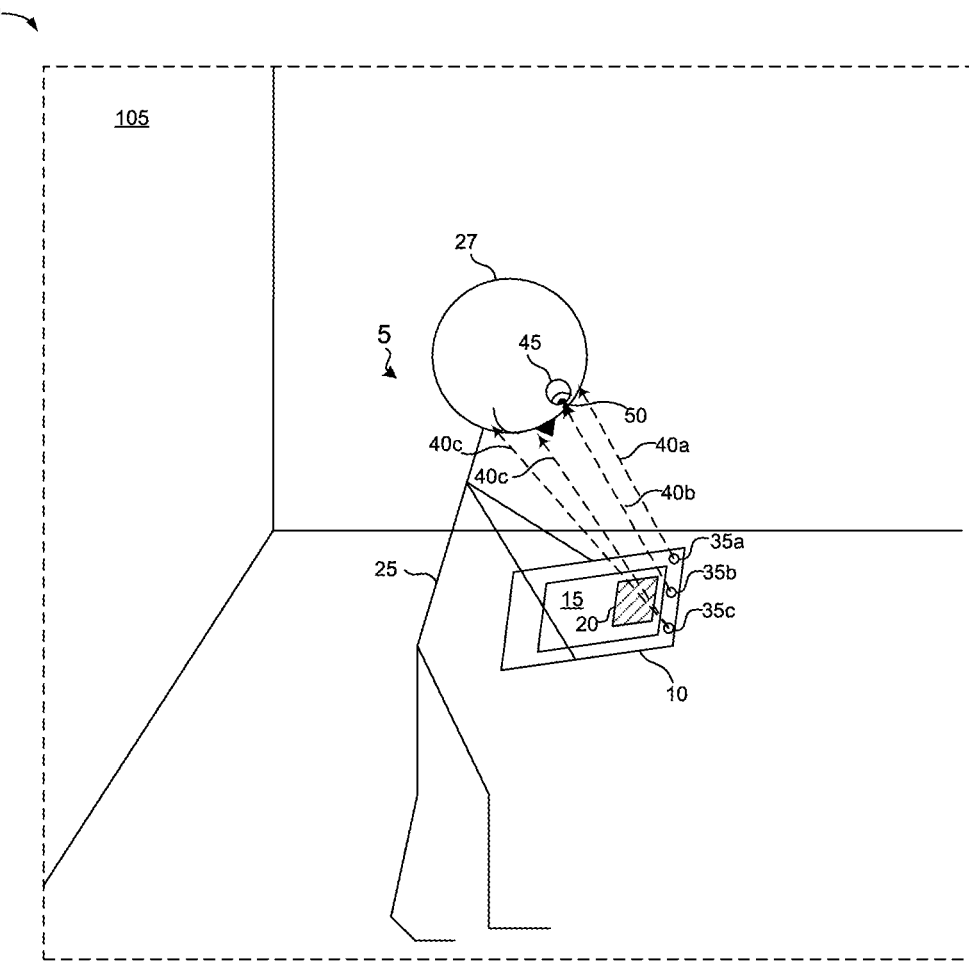
FIG. 1 illustrates a device obtaining sensor data from a user according to some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

FIG. 1 illustrates an example environment 100 of a real-world environment 105 (e.g., a room) including a device 10 with a display 15. In some implementations, the device 10 displays content 20 to a user 25. For example, content 20 may be a button, a user interface icon, a text box, a graphic, an avatar of the user or another user, etc. In some implementations, the content 20 can occupy the entire display area of display 15.

The device 10 obtains image data, motion data, and/or physiological data (e.g., pupillary data, facial feature data, etc.) from the user 25 via a plurality of sensors (e.g., sensors 35a, 35b, and 35c). For example, the device 10 obtains eye gaze characteristic data 40b via sensor 35b, upper facial feature characteristic data 40a via sensor 35a, and lower facial feature characteristic data 40c via sensor 35c.

While this example and other examples discussed herein illustrate a single device 10 in a real-world environment 105, the techniques disclosed herein are applicable to multiple devices as well as to other real-world environments. For example, the functions of device 10 may be performed by multiple devices, with the sensors 35a, 35b, and 35c on each respective device, or divided among them in any combination.

In some implementations, the plurality of sensors (e.g., sensors 35a, 35b, and 35c) may include any number of sensors that acquire data relevant to the appearance of the user 25. For example, when wearing a head-mounted device (HMD), one sensor (e.g., a camera inside the HMD) may acquire the pupillary data for eye tracking, and one sensor on a separate device (e.g., one camera, such as a wide range view) may be able to capture all of the facial feature data of the user. Alternatively, if the device 10 is an HMD, a separate device may not be necessary. For example, if the device 10 is an HMD, in one implementation, sensor 35b may be located inside the HMD to capture the pupillary data (e.g., eye gaze characteristic data 40b), and additional sensors (e.g., sensor 35a and 35c) may be located on the HMD but on the outside surface of the HMD facing towards the user's head/face to capture the facial feature data (e.g., upper facial feature characteristic data 40a via sensor 35a, and lower facial feature characteristic data 40c via sensor 35c).

In some implementations, as illustrated in FIG. 1, the device 10 is a handheld electronic device (e.g., a smartphone or a tablet). In some implementations the device 10 is a laptop computer or a desktop computer. In some implementations, the device 10 has a touchpad and, in some implementations, the device 10 has a touch-sensitive display (also known as a "touch screen" or "touch screen display"). In some implementations, the device 10 is a wearable device such as an HMD.

In some implementations, the device 10 includes an eye tracking system for detecting eye position and eye movements via eye gaze characteristic data 40b. For example, an eye tracking system may include one or more infrared (IR) light-emitting diodes (LEDs), an eye tracking camera (e.g., near-IR (NIR) camera), and an illumination source (e.g., an NIR light source) that emits light (e.g., NIR light) towards the eyes of the user 25. Moreover, the illumination source of the device 10 may emit NIR light to illuminate the eyes of the user 25 and the NIR camera may capture images of the eyes of the user 25. In some implementations, images captured by the eye tracking system may be analyzed to detect position and movements of the eyes of the user 25, or to detect other information about the eyes such as color, shape, state (e.g., wide open, squinting, etc.), pupil dilation, or pupil diameter. Moreover, the point of gaze estimated from the eye tracking images may enable gaze-based interaction with content shown on the near-eye display of the device 10.

In some implementations, the device 10 has a graphical user interface (GUI), one or more processors, memory and one or more modules, programs or sets of instructions stored in the memory for performing multiple functions. In some implementations, the user 25 interacts with the GUI through finger contacts and gestures on the touch-sensitive surface. In some implementations, the functions include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program products configured for execution by one or more processors.

In some implementations, the device 10 employs various physiological sensor, detection, or measurement systems. Detected physiological data may include, but is not limited to, electroencephalography (EEG), electrocardiography (ECG), electromyography (EMG), functional near infrared spectroscopy signal (fNIRS), blood pressure, skin conductance, or pupillary response. Moreover, the device 10 may simultaneously detect multiple forms of physiological data in order to benefit from synchronous acquisition of physiological data. Moreover, in some implementations, the physiological data represents involuntary data, e.g., responses that are not under conscious control. For example, a pupillary response may represent an involuntary movement.

In some implementations, one or both eyes 45 of the user 25, including one or both pupils 50 of the user 25 present physiological data in the form of a pupillary response (e.g., eye gaze characteristic data 40*b*). The pupillary response of the user 25 results in a varying of the size or diameter of the pupil 50, via the optic and oculomotor cranial nerve. For example, the pupillary response may include a constriction response (miosis), e.g., a narrowing of the pupil, or a dilation response (mydriasis), e.g., a widening of the pupil. In some implementations, the device 10 may detect patterns of physiological data representing a time-varying pupil diameter.

The user data (e.g., upper facial feature characteristic data 40*a*, lower facial feature characteristic data 40*c*, and eye gaze characteristic data 40*b*) may vary in time and the device 10 may use the user data to generate and/or provide a representation of the user.

In some implementations, the user data (e.g., upper facial feature characteristic data 40*a* and lower facial feature characteristic data 40*c*) includes texture data of the facial features such as eyebrow movement, chin movement, nose movement, cheek movement, etc. For example, when a person (e.g., user 25) smiles, the upper and lower facial features (e.g., upper facial feature characteristic data 40*a* and lower facial feature characteristic data 40*c*) can include a plethora of muscle movements that may be replicated by a representation of the user (e.g., an avatar) based on the captured data from sensors 35.

According to some implementations, the electronic devices (e.g., device 10) can generate and present an extended reality (XR) environment to one or more users during a communication session. In contrast to a physical environment that people can sense and/or interact with without aid of electronic devices, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 2:
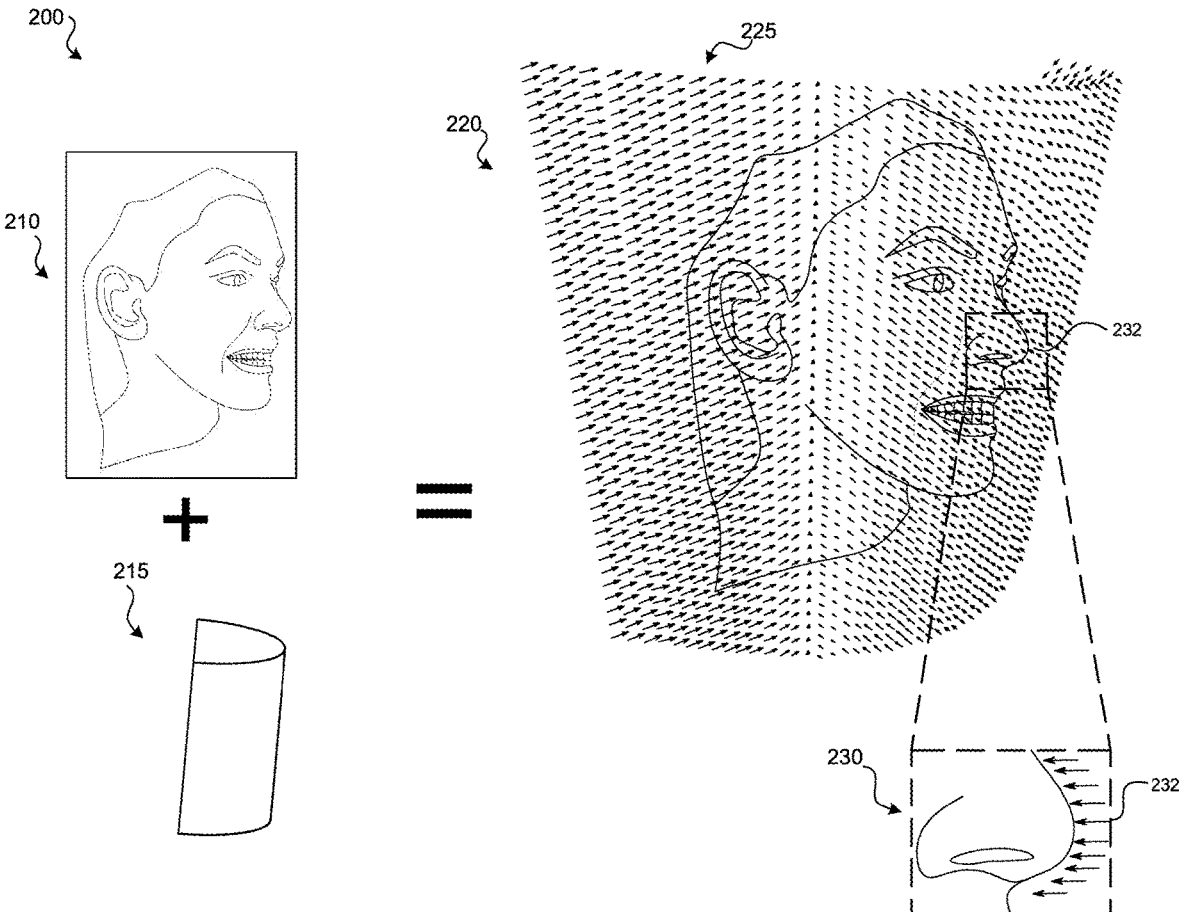
FIG. 2 illustrates an example of a surface of a two-dimensional (2D) manifold to visualize a parameterization of a representation of a face of a user in accordance with some implementations.

FIG. 2 illustrates an example environment 200 of a surface of a two-dimensional manifold to visualize a parameterization of a representation of a face of a user in accordance with some implementations. In particular, environment 200 illustrates a parameterization image 220 of a representation of a face of a user (e.g., user 25 of FIG. 1). For example, a feature parameterization instruction set can obtain live image data of a face of a user (e.g., image 210)

and parameterize different points upon the face based on a surface of a shape, such as the cylindrical shape 215. In other words, the feature parameterization instruction set can generate a set of values that represent a 3D shape and appearance of a user's face at a point in time to be used to generate a user representation (e.g., an avatar). In some implementations, a surface that has a non-planar shape (e.g., a cylindrical shape 215) may be used to reduce distortion. The set of values includes depth values that define depths of portions of the face relative to multiple points on a surface, e.g., points in a grid on a partially-cylindrical surface, such as the array of points 225 (e.g., vector arrows pointing towards the face of the representation of the user to represent a depth value, similar to a heightfield or heightmap). The parameterization values may include fixed parameters such as ray locations, endpoints, directions, etc., and the parameterization values may include changing parameters such as depth, color, texture, opacity, etc. that are updated with the live image data. For example, as illustrated in the expanded portion 230 of the user's nose, a depth value of one point (e.g., point 232 at the tip of the user's nose) may define that a portion of the face is at depth D1 behind that point's position on the surface, e.g., at depth D1 along a ray starting at, and orthogonal to, that point.

The techniques described herein use depth values that are different than the depth values in existing RGBDA images (e.g., red-green-blue-depth-alpha images), because RGBDA images define content depth relative to a single camera location, and the techniques described herein define depths as portions of a face relative to multiple points on a surface of a planar shape (e.g., a cylindrical shape). A curved surface, such as the cylindrical shape 215 implemented for the parameterization image 220, is used to reduce distortion of the user representation (e.g., avatar) at regions of the user representation that are not visible from a flat projection surface. In some implementations, the projection surface of the planar shape can be bent and shaped in any way to mitigate distortion in desired areas based on the application of the parameterization. The use of different bent/curved shapes allows the user representation to be rendered clearly from more points of view. Additional examples of planar shapes and parameterization images are illustrated in FIGS. 3A-3E.

Figure 3A:
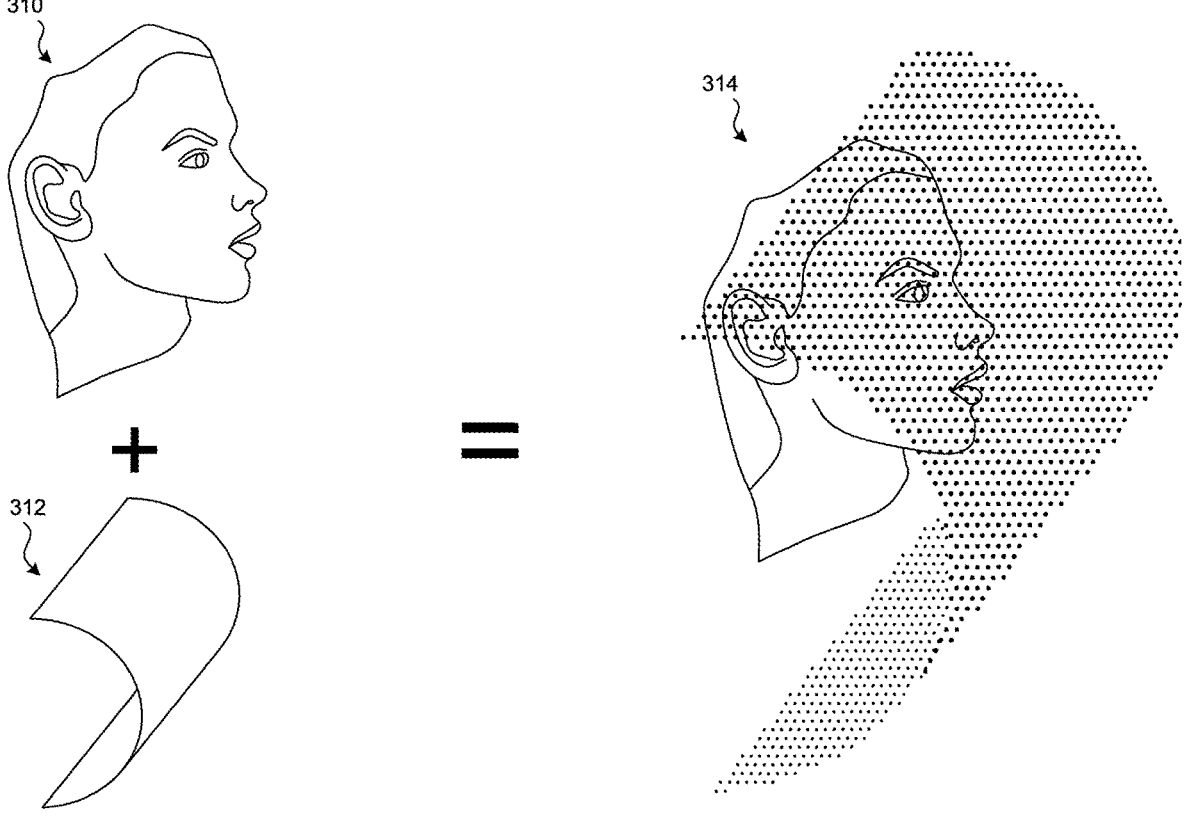
FIG. 3A illustrates an example of a surface of a 2D manifold of FIG. 2 oriented about a different axis in accordance with some implementations.
Figure 3B:
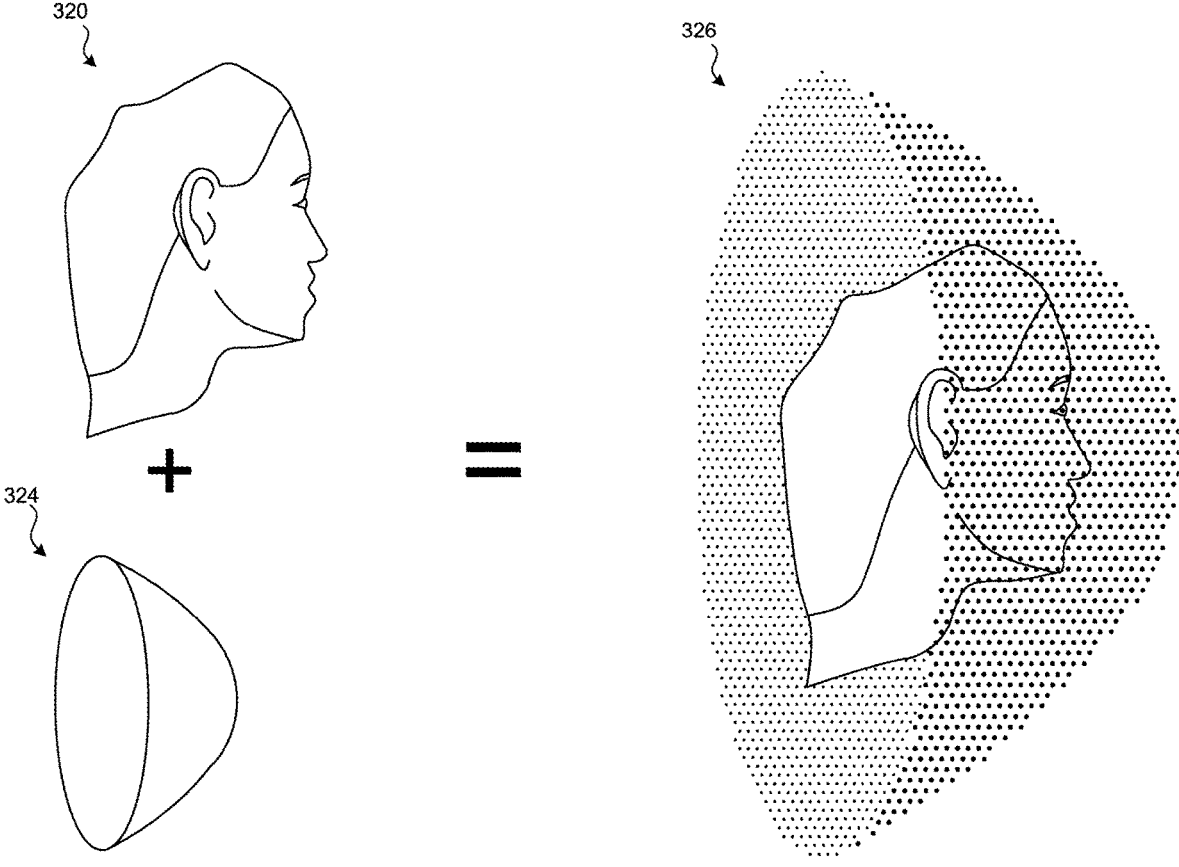
FIG. 3B illustrates an example of a surface of a 2D manifold of FIG. 2 with a hemispherical shape in accordance with some implementations.
Figure 3C:
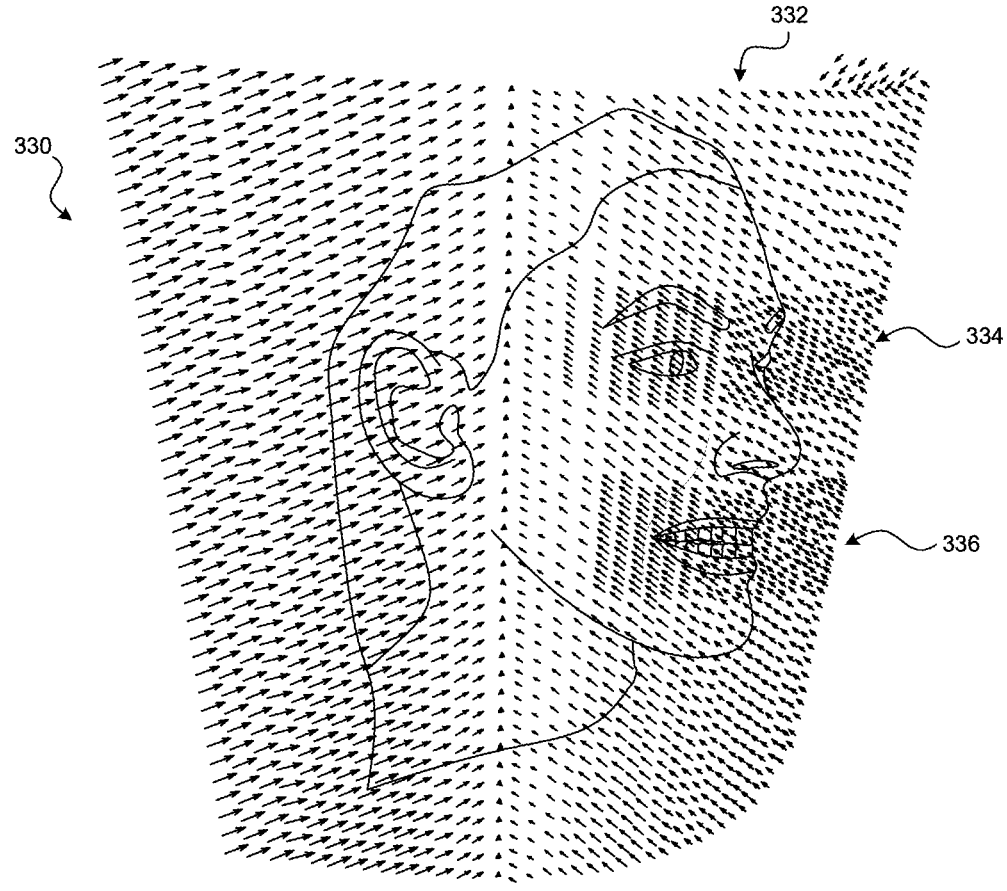
FIG. 3C illustrates an example of a surface of a 2D manifold of FIG. 2 with an emphasis of particular areas of the face of the user in accordance with some implementations.

FIGS. 3A-3C illustrate different examples of a surface of a 2D manifold to visualize a parameterization of a representation of a face of a user in accordance with some implementations. In particular, FIG. 3A illustrates the planar surface, such as a cylindrical surface similar to FIG. 2, but is oriented about a different axis. For example, FIG. 3A illustrates parameterization image 314 of a representation of a face of a user (e.g., image 310) including an array of points (e.g., vector arrows pointing towards the face of the representation of the user) that is a cylindrical surface/shape (e.g., cylindrical shape 314) that is curved about an x-axis. FIG. 3B illustrates parameterization image 326 of a face of a user (e.g., image 320) including an array of points that includes a hemispherical surface/shape (e.g., hemispherical shape 324) as a 2D manifold.

FIGS. 2, 3A, and 3B illustrate the points of the surface (e.g., the surface of the 2D manifold) as spaced at regular intervals along vertical and horizontal lines on the surface (e.g., evenly spaced vector arrows pointing towards the face of the representation of the user). In some implementations, the points may be unevenly distributed across the surface of the 2D manifold, such as not regularly spaced along vertical and horizontal grid lines about a surface but may be focused on particular area(s) of the user's face. For example, some areas can have more points where there might be more detail/movement in the face's structure, and some points can have fewer points in areas where there might be less detail/movement, like forehead (less detail) and nose (doesn't move much). For example, as illustrated in FIG. 3C, parameterization image 330 including an array of points 332 that is a cylindrical surface/shape includes an area 334 that shows a higher density of points around the eyes, and area 336 that shows a higher density of points around the mouth. For example, when generating a representation of a user during a communication session (e.g., generating an avatar), techniques described herein may selectively focus more on the areas of the eyes and mouth that would likely move more during a conversation, thus producing a more accurate representation of a person during a communication session. For example, techniques described herein may render updates to a user representation around mouth and eyes at a faster frame rate than the other portions of the face that do not move as much during a conversation (e.g., forehead, ears, etc.).

Figure 4:
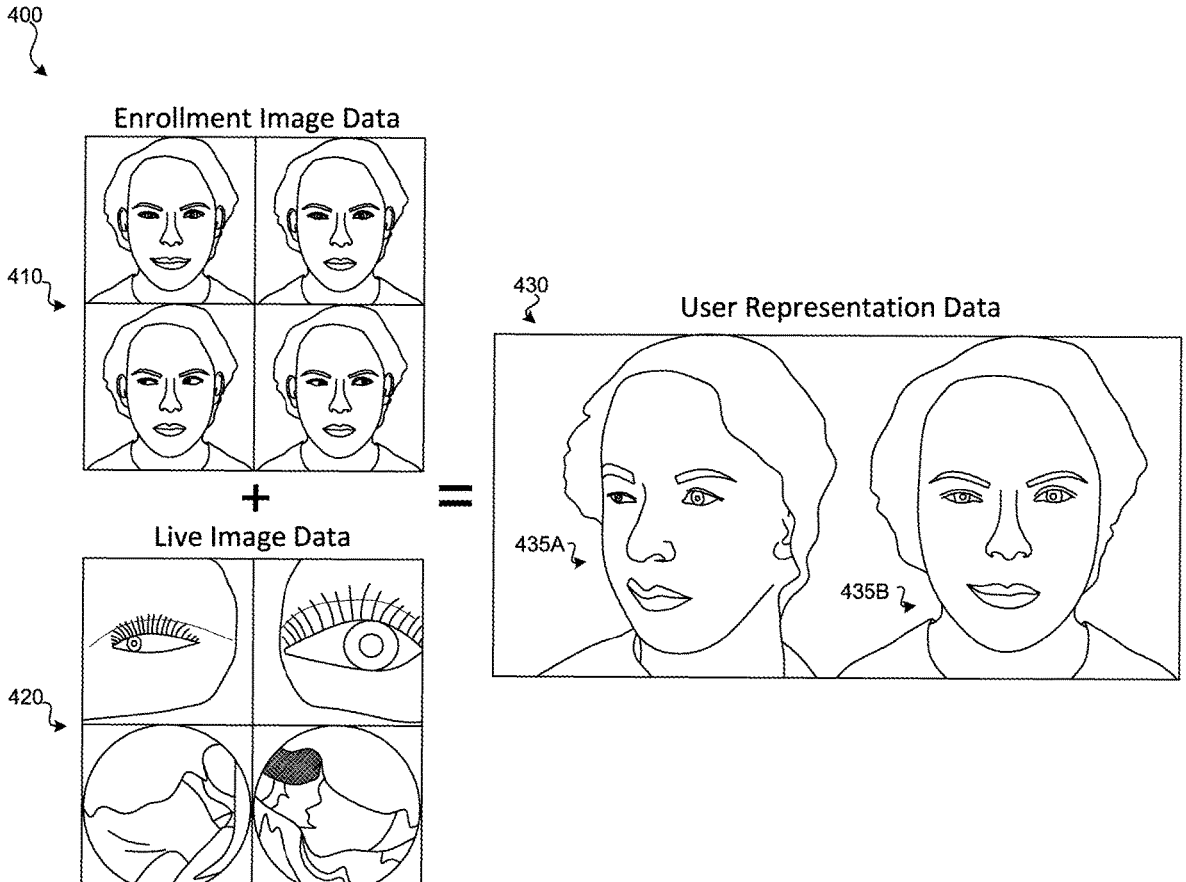
FIG. 4 illustrates an example of generating and displaying portions of a representation of a face of a user in accordance with some implementations.

FIG. 4 illustrates an example of generating and displaying portions of a representation of a face of a user in accordance with some implementations. In particular, FIG. 4 illustrates an example environment 400 of a process for combining enrollment image data 410 and live image data 420 to generate user representation data 430 (e.g., an avatar 435). Enrollment image data 410 illustrates images of a user (e.g., user 25 of FIG. 1) during an enrollment process. For example, the enrollment personification may be generated as the system obtains image data (e.g., RGB images) of the user's face while the user is providing different facial expressions. For example, the user may be told to "raise your eyebrows," "smile," "frown," etc., in order to provide the system with a range of facial features for an enrollment process. An enrollment personification preview may be shown to the user while the user is providing the enrollment images to get a visualization of the status of the enrollment process. In this example, enrollment image data 410 displays the enrollment personification with four different user expressions, however, more or less different expressions may be utilized to acquire sufficient data for the enrollment process. The live image data 420 represents examples of acquired images of the user while using the device such as during an XR experience (e.g., live image data while using the device 10 of FIG. 1, such as an HMD). For example, the live image data 420 represents the images acquired while a user is wearing the device 10 of FIG. 1 as an HMD. For example, if the device 10 is an HMD, in one implementation, sensor 35b may be located inside the HMD to capture the pupillary data (e.g., eye gaze characteristic data 40b), and additional sensors (e.g., sensor 35a and 35c) may be located on the HMD but on the outside surface of the HMD facing towards the user's head/face to capture the facial feature data (e.g., upper facial feature characteristic data 40a via sensor 35a, and lower facial feature characteristic data 40c via sensor 35c).

User representation data 430 is an example illustration of a user during an avatar display process. For example, the avatar 435A (side facing) and avatar 435B forward facing are generated based on acquired enrollment data and updated as the system obtains and analyzes the real-time image data and updates different values for the planar surface (e.g., the values for the vector points of the array 225 are updated for each acquired live image data).

Figure 5:
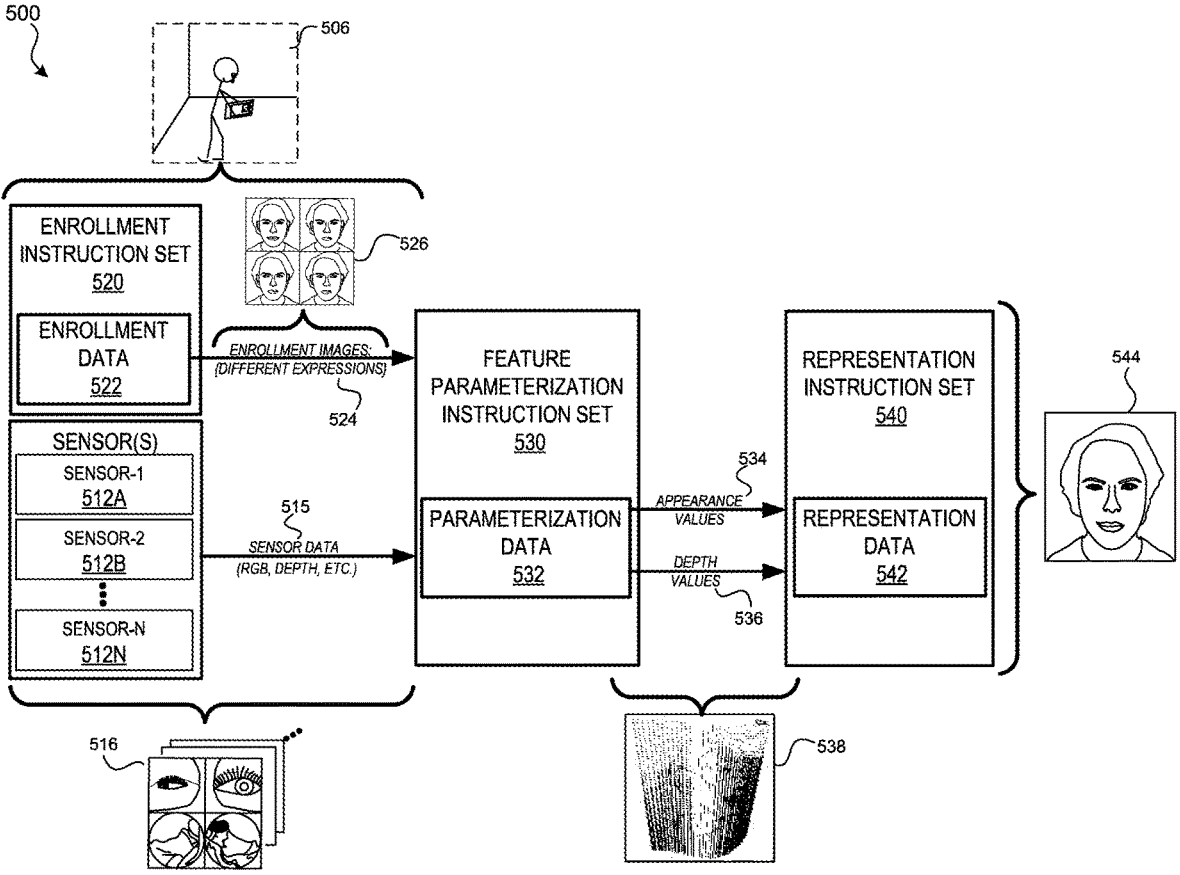
FIG. 5 illustrates a system flow diagram that can generate a representation of a face of a user based on parameterization data in accordance with some implementations.

FIG. 5 is a system flow diagram of an example environment 500 in which a system can generate a representation of a face of a user based on parameterization data according to some implementations. In some implementations, the system flow of the example environment 500 is performed on a device (e.g., device 10 of FIG. 1), such as a mobile device, desktop, laptop, or server device. The images of the example environment 500 can be displayed on a device (e.g., device 10 of FIG. 1) that has a screen for displaying images and/or a screen for viewing stereoscopic images such as a head-mounted device (HMD). In some implementations, the system flow of the example environment 500 is performed on processing logic, including hardware, firmware, software, or a combination thereof. In some implementations, the system flow of the example environment 500 is performed on a processor executing code stored in a non-transitory computer-readable medium (e.g., a memory).

In some implementations, the system flow of the example environment 500 includes an enrollment process, a feature tracking/parameterization process, and an avatar display process. Alternatively, the example environment 500 may only include a feature tracking/parameterization process and the avatar display process, and obtain the enrollment data from another source (e.g., previously stored enrollment data). In other words, the enrollment process may have already taken place such that the user's enrollment data is already provided because an enrollment process has already completed.

The system flow of the enrollment process of the example environment 500 acquires image data (e.g., RGB data) from sensors of a physical environment (e.g., the physical environment 105 of FIG. 1), and generates enrollment data. The enrollment data may include textures, muscle activations, etc., for the most, if not all, of the user's face. In some implementations, the enrollment data may be captured while the user is provided different instructions to acquire different poses of the user's face. For example, the user may be told to "raise your eyebrows," "smile," "frown," etc., in order to provide the system with a range of facial features for an enrollment process.

The system flow of the avatar display process of the example environment 500 acquires image data (e.g., RGB, depth, IR, etc.) from sensors of a physical environment (e.g., the physical environment 105 of FIG. 1), determines parameterization data of facial features, obtains and assesses the enrollment data, and generates and displays portions of a representation of a face (e.g., a 3D avatar) of a user based on parameterization values. For example, generating and displaying portions of a representation of a face of a user technique described herein can be implemented on real-time sensor data that are streamed to the end user (e.g., a 3D avatar overlaid onto images of a physical environment within a CGR environment). In an exemplary implementation, the avatar display process occurs during real-time display (e.g., an avatar is updated in real-time as the user is making facial gestures and changes to his or her facial features). Alternatively, the avatar display process may occur while analyzing streaming image data (e.g., generating a 3D avatar for person from a video).

In an example implementation, the environment 500 includes an image composition pipeline that acquires or obtains data (e.g., image data from image source(s) such as sensors 512A-512N) of the physical environment. Example environment 500 is an example of acquiring image sensor data (e.g., light intensity data—RGB) for the enrollment process to generate enrollment data (e.g., image data 524 of different expressions) and acquiring image sensor data 515 (e.g., light intensity data, depth data, and position information) for the parameterization process for a plurality of image frames. For example, illustration 506 (e.g., example environment 100 of FIG. 1) represents a user acquiring image data as the user scans his or her face and facial features in a physical environment (e.g., the physical environment 105 of FIG. 1) during an enrollment process. Image(s) 516 represent a user acquiring image data as the user scans his or her face and facial features in real-time (e.g., during a communication session). The image sensor(s) 512A, 512B, through 512N (hereinafter referred to sensor 512) may include a depth camera that acquires depth data, a light intensity camera (e.g., RGB camera) that acquires light intensity image data (e.g., a sequence of RGB image frames), and position sensors to acquire positioning information.

For the positioning information, some implementations include a visual inertial odometry (VIO) system to determine equivalent odometry information using sequential camera images (e.g., light intensity data) to estimate the distance traveled. Alternatively, some implementations of the present disclosure may include a SLAM system (e.g., position sensors). The SLAM system may include a multi-dimensional (e.g., 3D) laser scanning and range measuring system that is GPS-independent and that provides real-time simultaneous location and mapping. The SLAM system may generate and manage data for a very accurate point cloud that results from reflections of laser scanning from objects in an environment. Movements of any of the points in the point cloud are accurately tracked over time, so that the SLAM system can maintain precise understanding of its location and orientation as it travels through an environment, using the points in the point cloud as reference points for the location. The SLAM system may further be a visual SLAM system that relies on light intensity image data to estimate the position and orientation of the camera and/or the device.

In an example implementation, the environment 500 includes an enrollment instruction set 520 that is configured with instructions executable by a processor to generate enrollment data from sensor data. For example, the enrollment instruction set 520 acquires image data 506 from sensors such as light intensity image data (e.g., RGB images from light intensity camera), and generates enrollment data 522 (e.g., facial feature data such as textures, muscle activations, etc.) of the user. For example, the enrollment instruction set generates the enrollment image data 524 (e.g., enrollment image data 410 of FIG. 4).

In an example implementation, the environment 500 includes a feature parameterization instruction set 530 that is configured with instructions executable by a processor to generate a set of values (e.g., appearance values 534, depth values 536, etc.) that represent a 3D shape and appearance of a user's face at a point in time from the live image data (e.g., sensor data 515). For example, the feature parameterization instruction set 530 acquires sensor data 515 from sensors 512 such as light intensity image data (e.g., live camera feed such as RGB from light intensity camera), depth image data (e.g., depth image data from a depth from depth camera such as infrared or time-of-flight sensor), and other sources of physical environment information (e.g., camera positioning information such as position and orientation data, e.g., pose data, from position sensors) of a user in a physical environment (e.g., user 25 in the physical environment 105 of FIG. 1), and generates parameterization data 532 (e.g., muscle activations, geometric shapes, latent spaces for facial expressions, etc.) for face parameterization. For example, the parameterization data 532 can be represented by the parameterization image 538 (e.g., changing parameters such as appearance values such as texture data, color data, opacity, etc., and depth values 536 of different point of the face based on sensor data 515). Face parameterization for feature parameterization instruction set 530 may include taking partial views acquired from the sensor data 515 and determining from a geometric model small sets of parameters (e.g., the muscles of the face) to update the user representation. For example, the geometric model may include sets of data for the eyebrows, the eyes, the cheeks below the eyes, the mouth area, the chin area, etc. The parameterization tracking of the parametrization instruction set 530 may provide geometry of the facial features of the user.

In an example implementation, the environment 500 includes a representation instruction set 540 that is configured with instructions executable by a processor to generate a representation of the face (e.g., a 3D avatar) of the user based on the parameterization data 532. Additionally, the representation instruction set 540 is configured with instructions executable by a processor to display the portions of the representation based on the corresponding values as they are updated with live image data. For example, the representation instruction set 540 acquires parameterization data 532 (e.g., appearance values 534 and depth values 536) from the feature parameterization instruction set 530 and generates representation data 542 (e.g., a real-time representation of a user, such as a 3D avatar). For example, the representation instruction set 540 can generate the representation 544 (e.g., avatar 435 of FIG. 4).

In some implementations, the representation instruction set 540 acquires texture data directly from sensor data (e.g., RGB, depth, etc.). For example, representation instruction set 540 may acquire image data 506 from sensor(s) 512 and/or acquire sensor data 515 from sensors 512 in order to obtain texture data to generate the representation 544 (e.g., avatar 435 of FIG. 4) initially, and then updates the user representation 544 based on the updated values (parameterization data 532) acquired from the feature parameterization instruction set 530.

In some implementations, the representation instruction set 540 provides real-time in-painting. To process real-time in-painting, the representation instruction set 540 utilizes the enrollment data 522 to aid in filling in the representation (e.g., representation 544) when the device identifies (e.g., via geometric matching) a specific expression that matches the enrollment data. For example, a portion of the enrollment process may include enrolling a user's teeth when he or she smiled. Thus, when the device identifies that the user is smiling during the real-time images (e.g., sensor data 515), the representation instruction set 540 in-paints the user's teeth from his or her enrollment data.

In some implementations, the process for real-time in-painting of the representation instruction set 540 is provided by a machine learning model (e.g., a trained neural network) to identify patterns in the textures (or other features) in the enrollment data 522 and the parameterization data 532. Moreover, the machine learning model may be used to match the patterns with learned patterns corresponding to the user 25 such as smiling, frowning, talking, etc. For example, when a pattern of smiling is determined from the showing of the teeth (e.g., geometric matching as described herein), there may also be a determination of other portions of the face that also change for the user when he or she smiles (e.g., cheek movement, eyebrows, etc.). In some implementations, the techniques described herein may learn patterns specific to the particular user 25.

In some implementations, the representation instruction set 540 may be repeated for each frame captured during each instant/frame of a live communication session or other experience. For example, for each iteration, while the user is using the device (e.g., wearing the HMD), the example environment 500 may involve continuously obtaining the parameterization data 532 (e.g., appearance values 534 and depth values 536), and for each frame, update the displayed portions of the representation 544 based on updated values. For example, for each new frame of parameterization data, the system can update the display of the 3D avatar based on the new data.

Figure 6:
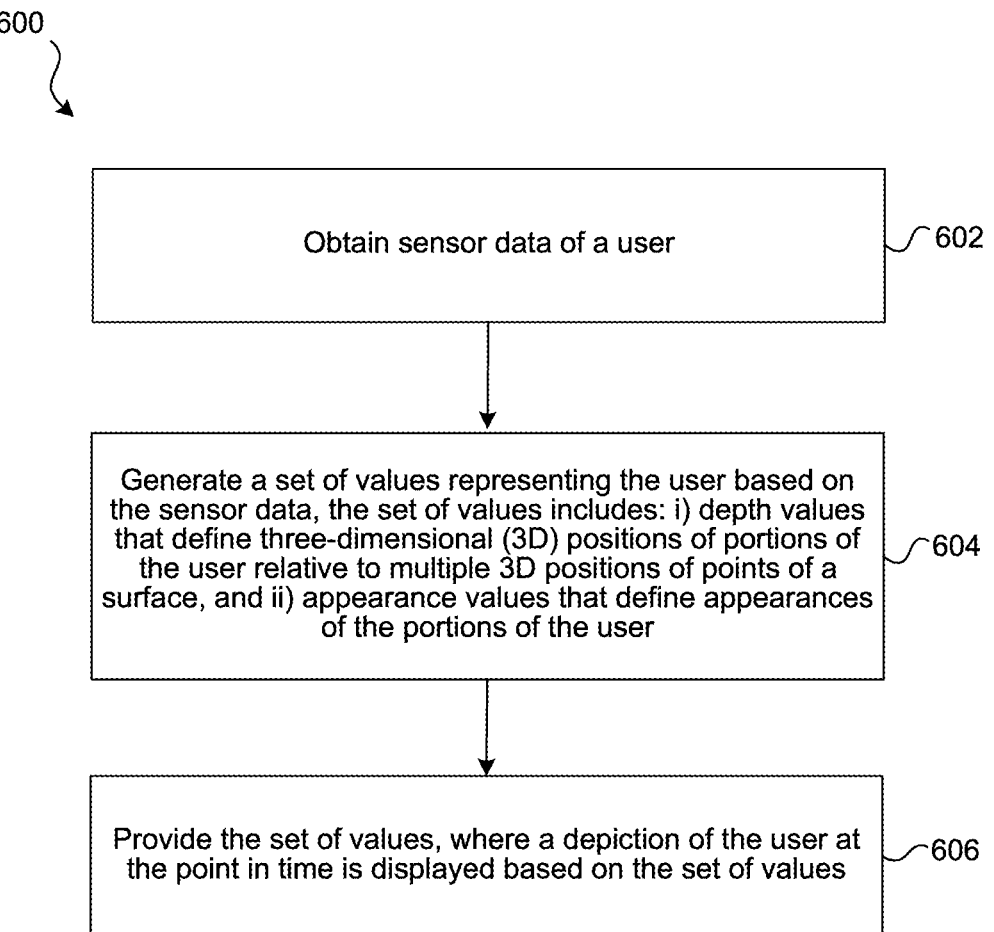
FIG. 6 is a flowchart representation of a method for providing a set of values for a depiction of a user in accordance with some implementations.

FIG. 6 is a flowchart illustrating an exemplary method 600. In some implementations, a device (e.g., device 10 of FIG. 1) performs the techniques of method 200 to provide a set of values for a depiction of a user. In some implementations, the techniques of method 600 are performed on a mobile device, desktop, laptop, HMD, or server device. In some implementations, the method 600 is performed on processing logic, including hardware, firmware, software, or a combination thereof. In some implementations, the method 600 is performed on a processor executing code stored in a non-transitory computer-readable medium (e.g., a memory).

At block 602, the method 600 obtaining sensor data of a user. For example, the sensor data (e.g., live data, such as video content that includes light intensity data (RGB) and depth data), is associated with a point in time, such as images from inward/down facing sensors while the user is wearing an HMD associate with a frame (e.g., sensors 35a, 35b, 35c shown in FIG. 1). In some implementations, the sensor data includes depth data (e.g., infrared, time-of-flight, etc.) and light intensity image data obtained during a scanning process.

In some implementations, obtaining sensor data may include obtaining a first set of data (e.g., enrollment data) corresponding to features (e.g., texture, muscle activation, shape, depth, etc.) of a face of a user in a plurality of configurations from a device (e.g., enrollment image data 410 of FIG. 4). In some implementations, the first set of data includes unobstructed image data of the face of the user. For example, images of the face may be captured while the user is smiling, brows raised, cheeks puffed out, etc. In some implementations, enrollment data may be obtained by a user taking the device (e.g., an HMD) off and capturing images without the device occluding the face or using another device (e.g., a mobile device) without the device (e.g., HMD) occluding the face. In some implementations, the enrollment data (e.g., the first set of data) is acquired from light intensity images (e.g., RGB image(s)). The enrollment data may include textures, muscle activations, etc., for most, if not all, of the user's face. In some implementations, the enrollment data may be captured while the user is provided different instructions to acquire different poses of the user's face. For example, the user may be instructed by a user interface guide to "raise your eyebrows," "smile," "frown," etc., in order to provide the system with a range of facial features for an enrollment process.

In some implementations, obtaining sensor data may include obtaining a second set of data corresponding to one or more partial views of the face from one or more image sensors while a user is using (e.g., wearing) an electronic device (e.g., HMD). For example, obtaining sensor data includes live image data 420 of FIG. 4. In some implementations, the second set of data includes partial images of the face of the user and thus may not represent all of the features of the face that are represented in the enrollment data. For example, the second set of images may include an image of some of the foreface/brow eyes (e.g., facial feature characteristic data 40a) from an upward-facing sensor (e.g., sensor 35a of FIG. 1). Additionally, or alternatively, the second set of images may include an image of some of the eyes (e.g., eye gaze characteristic data 40b) from an inward-facing sensor (e.g., sensor 35a of FIG. 1). Additionally, or alternatively, the second set of images may include an image of some of the cheeks, mouth and chin (e.g., facial feature characteristic data 40c) from a downward facing sensor (e.g., sensor 35c of FIG. 1). In some implementations, the electronic device includes a first sensor (e.g., sensor 35a of FIG. 1) and a second sensor (e.g., sensor 35c of FIG. 1), where the second set of data is obtained from at least one partial image of the face of the user from the first sensor from a first viewpoint (e.g., upper facial characteristic data 40a) and from at least one partial image of the face of the user from the second sensor from a second viewpoint (e.g., lower facial characteristic data 40c) that is different than the first viewpoint (e.g., multiple IFC cameras to capture different viewpoints of the user's facial and body movements).

At block 604, the method 600 generates a set of values representing the user based on the sensor data, the set of values includes: i) depth values that define 3D positions of portions of the user relative to multiple 3D positions of points of a projected surface, and ii) appearance values that define appearances of the portions of the user. For example, generating a set of values (e.g., RGB values, alpha values, and depth values—RGBDA) that represent the user based on the sensor data may involve using both live sensor data from inward/down facing cameras and enrollment data, e.g., images of a face in different expressions without wearing an HMD. In some implementations, generating the set of values may involve using a machine learning model trained to produce the set of values.

The set of values may include depth values that define 3D positions of portions of the user relative to multiple 3D positions of points of a projected surface. For example, a depth value of one point may define that a portion of the face is at depth D1 behind that point's position on the surface, e.g., at depth D1 along a ray starting at that point (e.g., ray 232 of FIG. 2). In some implementations, the depth values define a distance between a portion of the user and a corresponding point of the projected surface positioned along a ray normal to the projected surface at a position of the corresponding point. The techniques described herein uses depth values that are different than the depth values in existing RGBDA images, which define content depth relative to a single camera location. The appearance values may include values such as RGB data and alpha data that define appearances of the portions of the user. For example, the appearance values may include color, texture, opacity, etc.

In some implementations, the term "surface" refers to a 2D manifold that may be planar or non-planar. In some implementations, the points of the surface (e.g., the surface of the 2D manifold) are spaced at regular intervals along vertical and horizontal lines on the surface. In some implementations, the points are regularly spaced along vertical and horizontal grid lines on a partially-cylindrical surface as illustrated in FIG. 2. Alternatively, other planar and non-planar surfaces may be utilized. For example, as illustrated in FIG. 3A, the planar surface of a cylindrical surface may be oriented/curved about a different axis (e.g., y-axis in FIG. 2, x-axis in FIG. 3A, etc.). Additionally, or alternatively, the planar surface may be a hemispherical manifold as illustrated with parameterization image 326 in FIG. 3B.

In some implementations, the points may be unevenly distributed across the surface of the 2D manifold, such as not regularly spaced along vertical and horizontal grid lines about a surface but may be focused on particular area(s) of the user's face. For example, some areas can have more points where there might be more detail/movement in the face's structure, and some points can have fewer points in areas where there might be less detail/movement, like forehead (less detail) and nose (doesn't move much). For example, as illustrated in FIG. 3C, the area 334 shows a higher density of points around the eyes, and area 336 shows a higher density of points around the mouth.

In some implementations, the set of values is generated based on an alignment such that a subset of the points on a central area of the surface correspond to a central portion of a face of the user. For example, as illustrated in FIG. 2, the focused region of the nose of the user at area 230, the feature point of ray 232 is the tip of the nose of the person.

In some implementations, generating the set of values is further based on images of a face of the user captured while the user is expressing a plurality of different facial expressions. For example, the set of values is determined based on enrollment images of the face while the user is smiling, brows raised, cheeks puffed out, etc. In some implementations, the sensor data corresponds to only a first area of the user (e.g., parts not obstructed by the device, such as an HMD), and the set of image data (e.g., enrollment data) corresponds to a second area including a third area different than the first area. For example, a second area may include some of the parts obstructed by an HMD when it is being worn by the user.

In some implementations, determining the parameterizations that are specific to a user (e.g., generating the set of values), may be adapted to each specific user. For example, the parameterizations may be either fixed based on an enrollment identity (e.g., to better cover a person's head size or nose shape), or the parameterizations may be based on a current expression (e.g., when the mouth opens the parametrization may get longer). In an exemplary implementation, the method 600 may further include obtaining additional sensor data of a user associated with a second period of time, updating the set of values representing the user based on the additional sensor data for the second period of time, and providing the updated set of values, where the depiction of the user is updated at the second period of time based on the updated set of values (e.g., updating the ser of values based on a current expression, such that when the mouth opens the parametrization also gets longer).

In some implementations, generating the set of values representing the user is a based on a machine learning model trained to produce the set of values. For example, the process for generating the parameterization data of the feature parameterization instruction set 530 is provided by a machine learning model (e.g., a trained neural network) to identify patterns in the textures (or other features) in the enrollment data 522 and the sensor data 515 (live image data such as images 516). Moreover, the machine learning model may be used to match the patterns with learned patterns corresponding to the user 25 such as smiling, frowning, talking, etc. For example, when a pattern of smiling is determined from the showing of the teeth, there may also be a determination of other portions of the face that also change for the user when he or she smiles (e.g., cheek movement, eyebrows, etc.). In some implementations, the techniques described herein may learn patterns specific to the particular user 25 of FIG. 1.

At block 606, the method 600 provides the set of values, where a depiction of the user at the point in time is displayed based on the set of values. For example, the set of points is a frame of 3D video data sent during a communication session with another device and the other device uses the set of values such as the RGBDA information (along with information regarding how to interpret the depth values) to render a view of the face of the user. In some implementations, sequential frames of face data (sets of values representing the 3D shape and appearance of the user's face at different points in time) may be transmitted and used to display a live 3D video-like face depiction (e.g., a realistic moving avatar). In some implementations, the depiction of the user is displayed in real-time (e.g., an avatar shown to a second user on a display of a second device of the second user).

In some implementations, providing the set of values includes sending a sequence of frames of 3D video data including a frame including the set of values during a communication session with a second device, wherein the second device renders an animated depiction of the user based on the sequence of frames of 3D video data. For example, the set of points may be a frame of 3D video data sent during a communication session with another device and the other device uses the set of values (along with information regarding how to interpret the depth values) to render a view of the face of the user. Additionally, or alternatively, sequential frames of face data (sets of values representing the 3D shape and appearance of the user's face at different points in time) may be transmitted and used to display a live 3D video-like face depiction.

In some implementations, the depiction of the user may include sufficient data to enable a stereo view of the user (e.g., left/right eye views) such that the face may be perceived with depth. In one implementation, a depiction of a face includes a 3D model of the face and views of the representation from a left eye position and a right eye position and are generated to provide a stereo view of the face.

In some implementations, certain parts of the face that may be of importance to conveying a realistic or honest appearance, such as the eyes and mouth, may be generated differently than other parts of the face. For example, parts of the face that may be of importance to conveying a realistic or honest appearance may be based on current camera data while other parts of the face may be based on previously-obtained (e.g., enrollment) face data.

In some implementations, a representation of a face is generated with texture, color, and/or geometry for various face portions identifying an estimate of how confident the generation technique is that such textures, colors, and/or geometries accurately correspond to the real texture, color, and/or geometry of those face portions based on the depth values and appearance values each frame of data. In some implementations, the depiction is a 3D avatar. For example, the representation is a 3D model that represents the user (e.g., user 25 of FIG. 1).

In some implementations, the method 600 may be repeated for each frame captured during each instant/frame of a live communication session or other experience. For example, for each iteration, while the user is using the device (e.g., wearing the HMD), the method 600 may involve continuously obtaining live sensor data (e.g., eye gaze characteristic data and facial feature data), and for each frame, updating the displayed portions of the representation based on the updated parameterization values (e.g., RGBDA values). For example, for each new frame, the system can update the parameterized values to update the display of the 3D avatar based on the new data.

In some implementations, an estimator or statistical learning method is used to better understand or make predictions about the physiological data (e.g., facial feature and gaze characteristic data). For example, statistics for gaze and facial feature characteristic data may be estimated by sampling a dataset with replacement data (e.g., a bootstrap method).

Figure 7:
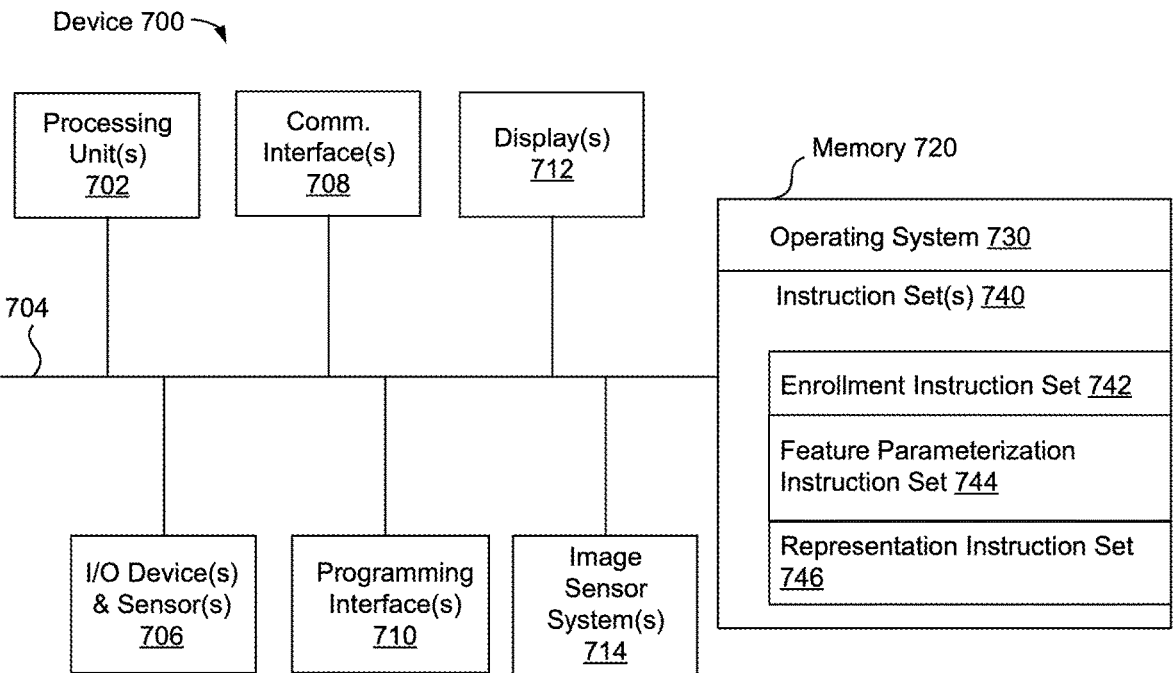
FIG. 7 is a block diagram illustrating device components of an exemplary device according to some implementations.

FIG. 7 is a block diagram of an example device 700. Device 700 illustrates an exemplary device configuration for device 10. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 10 includes one or more processing units 702 (e.g., microprocessors, ASICs, FPGAs, GPUs, CPUs, processing cores, and/or the like), one or more input/output (I/O) devices and sensors 706, one or more communication interfaces 708 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, 120, and/or the like type interface), one or more programming (e.g., I/O) interfaces 710, one or more displays 712, one or more interior and/or exterior facing image sensor systems 714, a memory 720, and one or more communication buses 704 for interconnecting these and various other components.

In some implementations, the one or more communication buses 704 include circuitry that interconnects and controls communications between system components. In some implementations, the one or more I/O devices and sensors 706 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 712 are configured to present a view of a physical environment or a graphical environment to the user. In some implementations, the one or more displays 712 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 712 correspond to diffractive, reflective, polarized, holographic, etc. waveguide displays. In one example, the device 10 includes a single display. In another example, the device 10 includes a display for each eye of the user.

In some implementations, the one or more image sensor systems 714 are configured to obtain image data that corresponds to at least a portion of the physical environment 105. For example, the one or more image sensor systems 714 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 714 further include illumination sources that emit light, such as a flash. In various implementations, the one or more image sensor systems 714 further include an on-camera image signal processor (ISP) configured to execute a plurality of processing operations on the image data.

The memory 720 includes high-speed random-access memory, such as DRAM, SRAM, DDR RAM, or other random-access solid-state memory devices. In some implementations, the memory 720 includes non-volatile memory, such as one or more magnetic disk storage devices, optical disk storage devices, flash memory devices, or other non-volatile solid-state storage devices. The memory 720 optionally includes one or more storage devices remotely located from the one or more processing units 702. The memory 720 includes a non-transitory computer readable storage medium.

In some implementations, the memory 720 or the non-transitory computer readable storage medium of the memory 720 stores an optional operating system 730 and one or more instruction set(s) 740. The operating system 730 includes procedures for handling various basic system services and for performing hardware dependent tasks. In some implementations, the instruction set(s) 740 include executable software defined by binary information stored in the form of electrical charge. In some implementations, the instruction set(s) 740 are software that is executable by the one or more processing units 702 to carry out one or more of the techniques described herein.

The instruction set(s) 740 include an enrollment instruction set 742, a feature parameterization instruction set 744, and a representation instruction set 746. The instruction set(s) 740 may be embodied a single software executable or multiple software executables.

In some implementations, the enrollment instruction set 742 is executable by the processing unit(s) 702 to generate enrollment data from image data. The enrollment instruction set 742 (e.g., enrollment instruction set 520 of FIG. 5) may be configured to provide instructions to the user in order to acquire image information to generate the enrollment personification (e.g., enrollment image data 524) and determine whether additional image information is needed to generate an accurate enrollment personification to be used by the avatar display process. To these ends, in various implementations, the instruction includes instructions and/or logic therefor, and heuristics and metadata therefor.

In some implementations, the feature parameterization instruction set 744 (e.g., feature parameterization instruction set 530 of FIG. 5) is executable by the processing unit(s) 702 to parameterize a user's facial features and eye gaze characteristics (e.g., generate appearance values and depth values) by using one or more of the techniques discussed herein or as otherwise may be appropriate. To these ends, in various implementations, the instruction includes instructions and/or logic therefor, and heuristics and metadata therefor.

In some implementations, the feature representation instruction set 746 (e.g., representation instruction set 540 of FIG. 5) is executable by the processing unit(s) 702 to generate and display a representation of the face (e.g., a 3D avatar) of the user based on the first set of data (e.g., enrollment data) and the second set of data (e.g., parameterization data), wherein portions of the representation correspond to different parameterization values. To these ends, in various implementations, the instruction includes instructions and/or logic therefor, and heuristics and metadata therefor.

Although the instruction set(s) 740 are shown as residing on a single device, it should be understood that in other implementations, any combination of the elements may be located in separate computing devices. Moreover, FIG. 7 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Figure 8:
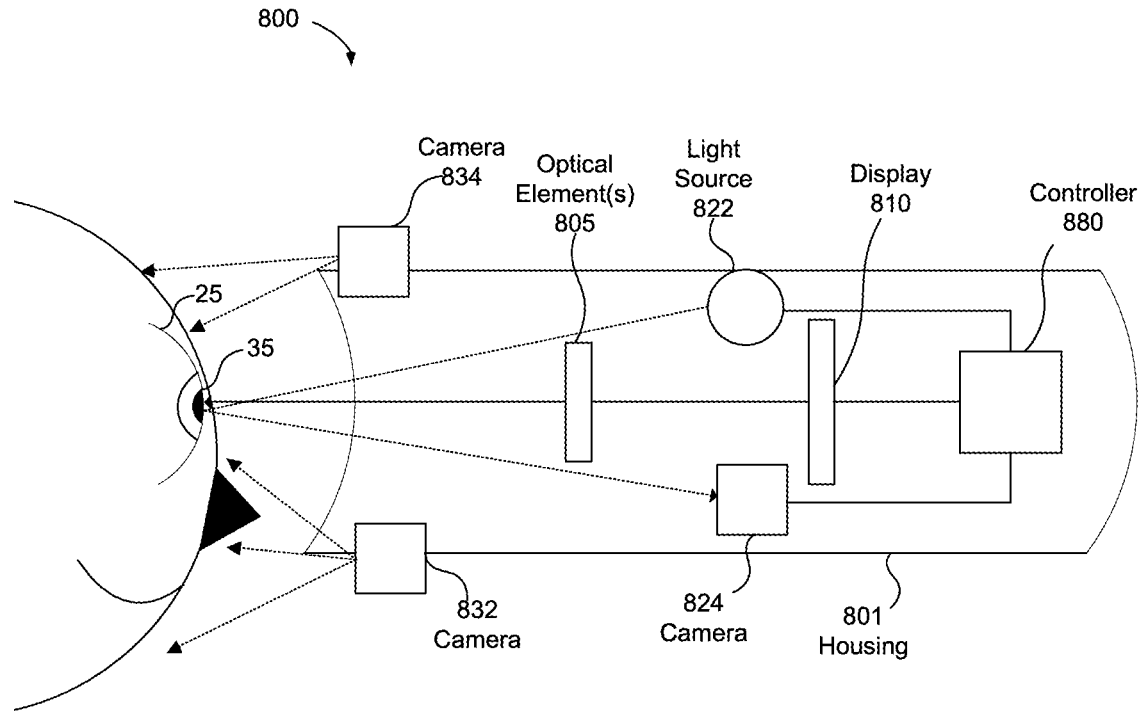
FIG. 8 is a block diagram of an example head-mounted device (HMD) in accordance with some implementations.

FIG. 8 illustrates a block diagram of an exemplary head-mounted device 800 in accordance with some implementations. The head-mounted device 800 includes a housing 801 (or enclosure) that houses various components of the head-mounted device 800. The housing 801 includes (or is coupled to) an eye pad (not shown) disposed at a proximal (to the user 25) end of the housing 801. In various implementations, the eye pad is a plastic or rubber piece that comfortably and snugly keeps the head-mounted device 800 in the proper position on the face of the user 25 (e.g., surrounding the eye of the user 25).

The housing 801 houses a display 810 that displays an image, emitting light towards or onto the eye of a user 25. In various implementations, the display 810 emits the light through an eyepiece having one or more optical elements 805 that refracts the light emitted by the display 810, making the display appear to the user 25 to be at a virtual distance farther than the actual distance from the eye to the display 810. For example, optical element(s) 805 may include one or more lenses, a waveguide, other diffraction optical elements (DOE), and the like. For the user 25 to be able to focus on the display 810, in various implementations, the virtual distance is at least greater than a minimum focal distance of the eye (e.g., 7 cm). Further, in order to provide a better user experience, in various implementations, the virtual distance is greater than 1 meter.

The housing 801 also houses a tracking system including one or more light sources 822, camera 824, camera 832, camera 834, and a controller 880. The one or more light sources 822 emit light onto the eye of the user 25 that reflects as a light pattern (e.g., a circle of glints) that can be detected by the camera 824. Based on the light pattern, the controller 880 can determine an eye tracking characteristic of the user 25. For example, the controller 880 can determine a gaze direction and/or a blinking state (eyes open or eyes closed) of the user 25. As another example, the controller 880 can determine a pupil center, a pupil size, or a point of regard. Thus, in various implementations, the light is emitted by the one or more light sources 822, reflects off the eye of the user 25, and is detected by the camera 824. In various implementations, the light from the eye of the user is reflected off a hot mirror or passed through an eyepiece before reaching the camera 824.

The display 810 emits light in a first wavelength range and the one or more light sources 822 emit light in a second wavelength range. Similarly, the camera 824 detects light in the second wavelength range. In various implementations, the first wavelength range is a visible wavelength range (e.g., a wavelength range within the visible spectrum of approximately 400-700 nm) and the second wavelength range is a near-infrared wavelength range (e.g., a wavelength range within the near-infrared spectrum of approximately 700-1400 nm).

In various implementations, eye tracking (or, in particular, a determined gaze direction) is used to enable user interaction (e.g., the user 25 selects an option on the display 810 by looking at it), provide foveated rendering (e.g., present a higher resolution in an area of the display 810 the user 25 is looking at and a lower resolution elsewhere on the display 810), or correct distortions (e.g., for images to be provided on the display 810).

In various implementations, the one or more light sources 822 emit light towards the eye of the user 25 which reflects in the form of a plurality of glints.

In various implementations, the camera 824 is a frame/shutter-based camera that, at a particular point in time or multiple points in time at a frame rate, generates an image of the eye of the user 25. Each image includes a matrix of pixel values corresponding to pixels of the image which correspond to locations of a matrix of light sensors of the camera. In implementations, each image is used to measure or track pupil dilation by measuring a change of the pixel intensities associated with one or both of a user's pupils.

In various implementations, the camera 824 is an event camera including a plurality of light sensors (e.g., a matrix of light sensors) at a plurality of respective locations that, in response to a particular light sensor detecting a change in intensity of light, generates an event message indicating a particular location of the particular light sensor.

In various implementations, the camera 832 and camera 834 are frame/shutter-based cameras that, at a particular point in time or multiple points in time at a frame rate, can generate an image of the face of the user 25. For example, camera 832 captures images of the user's face below the eyes, and camera 834 captures images of the user's face above the eyes. The images captured by camera 832 and camera 834 may include light intensity images (e.g., RGB) and/or depth image data (e.g., Time-of-Flight, infrared, etc.).

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of physiological data to improve a user's experience of an electronic device with respect to interacting with electronic content. The present disclosure contemplates that in some instances, this gathered data may include personal information data that uniquely identifies a specific person or can be used to identify interests, traits, or tendencies of a specific person. Such personal information data can include physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve interaction and control capabilities of an electronic device. Accordingly, use of such personal information data enables calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access his or her stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
at a processor of a device:
    obtaining sensor data acquired by sensors with respect to an appearance of portions of a user's face, wherein the sensor data comprises depth data and has been acquired by the sensors at a point in time;
    generating a set of values representing the appearance of portions of the user's face based on the sensor data, wherein the set of values comprises:
        depth values that define three-dimensional (3D) positions of the appearance of portions of the user's face relative to multiple points of a curved surface, wherein the depth values define a distance between a portion of the user's face and a corresponding point of the curved surface positioned along a ray normal to the curved surface at a position of the corresponding point; and
        appearance values that define appearances of the portions of the user's face when the appearance of portions of the user's face is displayed; and
    providing the set of values, wherein a depiction of the appearance of portions of the user's face at the point in time is displayed based on the set of values.

2. The method of claim 1, wherein the multiple points of the curved surface are spaced at regular intervals along vertical and horizontal lines on the curved surface.

3. The method of claim 1, wherein the curved surface is nonplanar.

4. The method of claim 1, wherein the curved surface is at least partially-cylindrical.

5. The method of any of claim 1, wherein the curved surface is planar.

6. The method of claim 1, wherein the set of values is generated based on an alignment such that a subset of the multiple points of the curved surface on a central area of the curved surface correspond to a central portion of the user's face.

7. The method of claim 1, wherein generating the set of values is further based on images of the user's face captured while the user is expressing a plurality of different facial expressions.

8. The method of claim 7, wherein:

the sensor data corresponds to only a first area of the user; and the set of image data corresponds to a second area comprising a third area different than the first area.

9. The method of claim 1, further comprising:

obtaining additional sensor data of a user associated with a second period of time;

updating the set of values representing the user based on the additional sensor data for the second period of time; and providing the updated set of values, wherein the depiction of the user is updated at the second period of time based on the updated set of values.

10. The method of claim 1, wherein providing the set of values comprises sending a sequence of frames of 3D video data comprising a frame comprising the set of values during a communication session with a second device, wherein the second device renders an animated depiction of the user based on the sequence of frames of 3D video data.

11. The method of claim 1, wherein the device comprises a first sensor and a second sensor, wherein the sensor data is obtained from at least one partial image of the user's face from the first sensor from a first viewpoint and from at least one partial image of the user's face from the second sensor from a second viewpoint that is different than the first viewpoint.

12. The method of claim 1, wherein the depiction of the user is displayed in real-time.

13. The method of claim 1, wherein generating the set of values representing the user's face is based on a machine learning model trained to produce the set of values.

14. The method of claim 1, wherein the appearance values comprise color values, texture values, or opacity values.

15. The method of claim 1, wherein the device is a head-mounted device (HMD).

16. The method of claim 15, wherein the HMD comprises one or more inward facing image sensors and one or more downward facing image sensors, and the sensor data is captured by the one or more inward facing sensors and the one or more downward facing image sensors.

17. A device comprising:

a non-transitory computer-readable storage medium; and one or more processors coupled to the non-transitory computer-readable storage medium, wherein the non-transitory computer-readable storage medium comprises program instructions that, when executed on the one or more processors, cause the one or more processors to perform operations comprising:

obtaining sensor data acquired by sensors with respect to an appearance of portions of a user's face, wherein the sensor data comprises depth data and has been acquired by the sensors at a point in time;

generating a set of values representing the appearance of portions of the user's face based on the sensor data, wherein the set of values comprises:

depth values that define three-dimensional (3D) positions of the appearance of portions of the user's face relative to multiple points of a curved surface, wherein the depth values define a distance between a portion of the user's face and a corresponding point of the curved surface positioned along a ray normal to the curved surface at a position of the corresponding point; and appearance values that define appearances of the portions of the user's face when the appearance of portions of the user's face is displayed; and providing the set of values, wherein a depiction of the appearance of portions of the user's face at the point in time is displayed based on the set of values.

18. The device of claim 17, wherein the multiple points of the curved surface are spaced at regular intervals along vertical and horizontal lines on the curved surface.

19. A non-transitory computer-readable storage medium, storing program instructions executable on a device to perform operations comprising:

obtaining sensor data acquired by sensors with respect to an appearance of portions of a user's face, wherein the sensor data comprises depth data and has been acquired by the sensors at a point in time;

generating a set of values representing the appearance of portions of the user's face based on the sensor data, wherein the set of values comprises:

depth values that define three-dimensional (3D) positions of the appearance of portions of the user's face relative to multiple points of a curved surface, wherein the depth values define a distance between a portion of the user's face and a corresponding point of the curved surface positioned along a ray normal to the curved surface at a position of the corresponding point; and appearance values that define appearances of the portions of the user's face when the appearance of portions of the user's face is displayed; and providing the set of values, wherein a depiction of the appearance of portions of the user's face at the point in time is displayed based on the set of values.

\* \* \* \* \*